(12) United States Patent
Neitzell et al.

(10) Patent No.: US 7,448,137 B2
(45) Date of Patent: *Nov. 11, 2008

(54) RECIPROCATING SAW

(75) Inventors: Roger D. Neitzell, North Prairie, WI (US); Andrew G. Gongola, Menomonee Falls, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/312,787

(22) Filed: Dec. 20, 2005

(65) Prior Publication Data

US 2006/0096104 A1    May 11, 2006

Related U.S. Application Data

(63) Continuation of application No. 11/011,986, filed on Dec. 14, 2004, now Pat. No. 7,127,973, which is a continuation-in-part of application No. 09/606,955, filed on Jun. 29, 2000, now Pat. No. 6,829,831, which is a continuation of application No. 09/474,033, filed on Dec. 28, 1999, now Pat. No. 6,508,151, which is a continuation of application No. 09/020,436, filed on Feb. 9, 1998, now abandoned.

(51) Int. Cl.
B27B 19/00    (2006.01)
B27B 19/04    (2006.01)

(52) U.S. Cl. .......................................... 30/392; 30/394

(58) Field of Classification Search ........... 30/392–394, 30/372, 374; 173/94–97, 49; 74/50, 60
See application file for complete search history.

(56) References Cited

U.S. PATENT DOCUMENTS 1,349,661 A    8/1920  Buhl (Continued)

FOREIGN PATENT DOCUMENTS

CA         693682         9/1964

(Continued)

OTHER PUBLICATIONS

Hitachi, Instruction Manual and Safety Instructions, Reciprocating Saw, Model CR 13VA.

(Continued)

*Primary Examiner*—Jason Prone
(74) *Attorney, Agent, or Firm*—Michael Best & Friedrich LLP

(57) ABSTRACT

A reciprocating saw, including a housing, a spindle mounted for reciprocation relative to the housing, the spindle having an end adapted to receive a saw blade, the saw blade having a first orientation relative to the spindle to have a first cutting direction and a second orientation relative to the spindle to have a second cutting direction opposite the first cutting direction, and a drive assembly connected to the spindle and operable to selectively drive the saw blade along a first path of travel during a first cutting stroke and along a second path of travel during a second cutting stroke. The first path of travel is characterized by movement at least partially in the first cutting direction and the second path of travel is characterized by movement at least partially in the second cutting direction.

27 Claims, 15 Drawing Sheets

U.S. PATENT DOCUMENTS

| | | | |
|---|---|---|---|
| 3,095,748 A | 7/1963 | Stelljes et al. | |
| 3,155,128 A | 11/1964 | Godfrey et al. | |
| 3,204,470 A | 9/1965 | Brucker | |
| 3,206,989 A | 9/1965 | Enders | |
| 3,236,111 A | 2/1966 | Naslund | |
| 3,269,197 A | 8/1966 | Enders | |
| 3,388,728 A | 6/1968 | Riley, Jr. et al. | |
| 3,461,732 A | 8/1969 | Gregory | |
| 3,542,097 A | 11/1970 | Dudek et al. | |
| 3,802,079 A | 4/1974 | Ketchpel, Jr. et al. | |
| 3,942,251 A | 3/1976 | Griffies et al. | |
| 3,945,120 A | 3/1976 | Ritz | |
| 3,971,132 A | 7/1976 | Griffies et al. | |
| 4,137,632 A | 2/1979 | Pfanzer | |
| 4,206,657 A * | 6/1980 | Palm | 30/392 |
| 4,238,884 A | 12/1980 | Walton, II | |
| 4,255,858 A | 3/1981 | Getts | |
| 4,262,421 A | 4/1981 | Bergler et al. | |
| 4,385,443 A | 5/1983 | O'Banion | |
| 4,545,123 A | 10/1985 | Hartmann | |
| 4,550,501 A | 11/1985 | Moores, Jr. et al. | |
| 4,628,605 A | 12/1986 | Clowers | |
| 4,962,588 A | 10/1990 | Fushiya et al. | |
| 5,009,012 A | 4/1991 | Martinez et al. | |
| 5,025,562 A | 6/1991 | Palm | |
| 5,050,307 A | 9/1991 | Palm | |
| 5,079,844 A | 1/1992 | Palm | |
| 5,099,705 A | 3/1992 | Dravnieks | |
| 5,165,173 A | 11/1992 | Miller | |
| 5,212,887 A | 5/1993 | Farmerie | |
| 5,392,519 A | 2/1995 | Inoue et al. | |
| 5,425,303 A * | 6/1995 | Shimizu et al. | 92/12.2 |
| 5,479,711 A | 1/1996 | Hathcock | |
| 5,555,626 A | 9/1996 | Fuchs | |
| 5,561,909 A | 10/1996 | Berg et al. | |
| 5,647,133 A | 7/1997 | Dassoulas | |
| 5,725,058 A | 3/1998 | Eriksson | |
| 5,782,000 A * | 7/1998 | Bednar | 30/393 |
| 5,832,611 A | 11/1998 | Schmitz | |
| 5,940,977 A | 8/1999 | Moores, Jr. | |
| 6,212,781 B1 | 4/2001 | Marinkovich et al. | |
| 6,233,833 B1 | 5/2001 | Grant et al. | |
| 6,249,979 B1 | 6/2001 | Bednar et al. | |
| 6,508,151 B1 | 1/2003 | Neitzell | |
| 6,732,815 B2 | 5/2004 | Hanke et al. | |
| 6,758,119 B1 | 7/2004 | Neitzell | |
| 6,772,662 B2 | 8/2004 | Marinkovich et al. | |
| 6,829,831 B1 | 12/2004 | Neitzell | |
| 6,877,235 B2 * | 4/2005 | Osada | 30/394 |
| 7,127,973 B2 * | 10/2006 | Neitzell et al. | 30/394 |
| 7,168,169 B2 * | 1/2007 | Moreno | 30/394 |
| 7,363,713 B2 * | 4/2008 | Hirabayashi et al. | 30/392 |
| 2001/0011420 A1* | 8/2001 | Osada | 30/392 |
| 2001/0034941 A1 | 11/2001 | Bednar et al. | |
| 2005/0132583 A1* | 6/2005 | Bednar et al. | 30/392 |
| 2007/0074408 A1* | 4/2007 | Zhang | 30/392 |

FOREIGN PATENT DOCUMENTS

| | | |
|---|---|---|
| DE | 744918 | 1/1944 |
| DE | 19947840 A1 * | 4/2000 |
| EP | 1156902 | 9/2004 |
| JP | 02139114 A * | 5/1990 |
| JP | 06079701 A * | 3/1994 |
| JP | 2000117535 A * | 4/2000 |
| WO | WO 98/07544 | 2/1998 |
| WO | WO 0047358 | 8/2000 |
| WO | WO 2006065728 A2 * | 6/2006 |

OTHER PUBLICATIONS

Hitachi, Electric Tool Parts List, Saber Saw, Model CR 13VA, List No. 0786, Feb. 15, 2000.

* cited by examiner

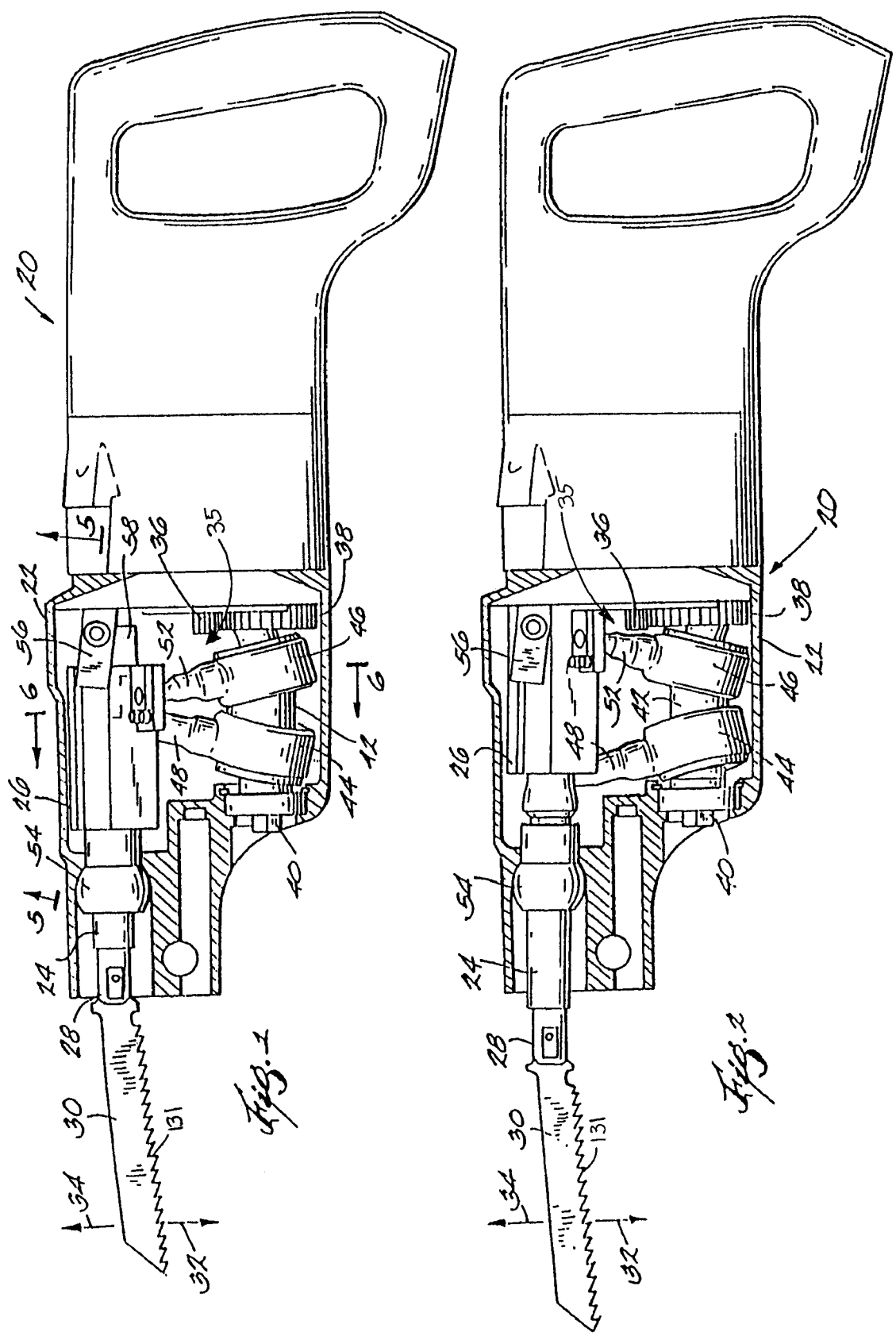

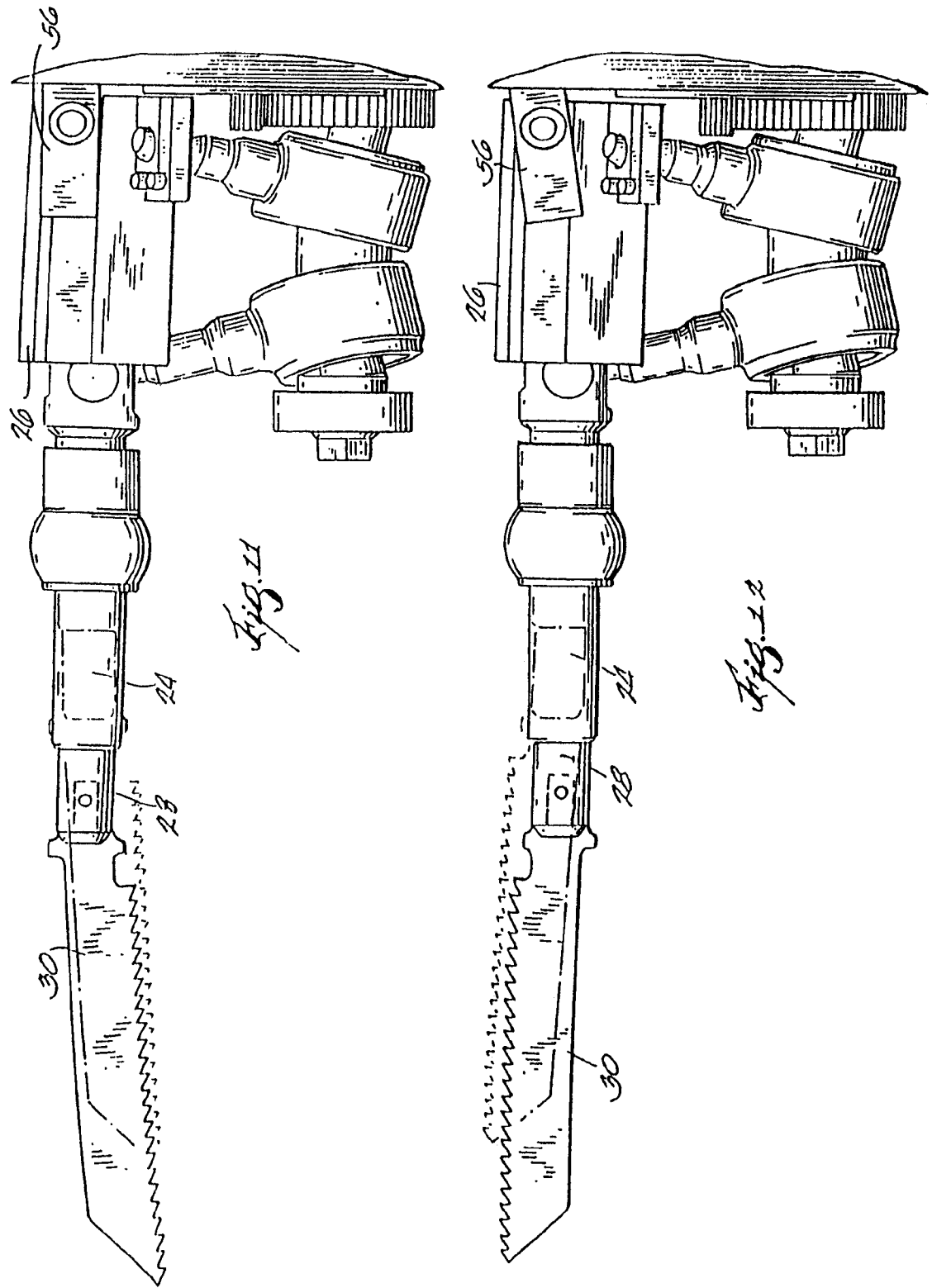

RECIPROCATING SAW

RELATED APPLICATIONS

This is a continuation of U.S. patent application Ser. No. 11/011,986, filed Dec. 14, 2004, now U.S. Pat. No. 7,127,973, issued Oct. 31, 2006, which is a continuation-in-part of U.S. patent application Ser. No. 09/606,955, filed Jun. 29, 2000, now U.S. Pat. No. 6,829,831, issued Dec. 14, 2004, which is a continuation of U.S. patent application Ser. No. 09/474,033, filed Dec. 28, 1999, now U.S. Pat. No. 6,508,151, issued Jan. 21, 2003, which is a continuation of U.S. patent application Ser. No. 09/020,436, filed Feb. 9, 1998, now abandoned, the entire contents of all of which are hereby incorporated by reference.

FIELD OF THE INVENTION

The present invention generally relates to the field of reciprocating saws.

BACKGROUND OF THE INVENTION

Reciprocating saws are used to cut a variety of objects, such as metal pipes, wood and drywall. Such saws typically include a housing and a spindle mounted in the housing for reciprocating motion along an axis that is parallel to the longitudinal extent of the spindle. An electric motor provides power to the spindle through a mechanical reciprocating device that converts the rotary motion of a motor shaft to reciprocating motion. Such mechanical reciprocating devices can, for example, include an eccentric drive, as disclosed in U.S. Pat. No. 5,079,844, or a wobble plate drive, as disclosed in U.S. Pat. Nos. 5,025,562 and 5,050,307.

In some reciprocating saws, the spindle reciprocates in an orbital motion as opposed to a straight line reciprocating motion. The orbital motion is characterized by a forward (i.e., in the cutting direction) motion of the saw blade as the saw blade is being retracted toward the saw on the cutting stroke, and a corresponding rearward (i.e., opposite the cutting direction) motion of the saw blade as the saw blade is being extended away from the saw on the return stroke. The result is a circuitous, or orbital, path of the saw blade. Such orbital motion is believed to improve the speed at which the saw cuts a workpiece by driving the saw blade into the workpiece during the cutting stroke and withdrawing the saw blade from the workpiece during the return stroke.

Orbital motion has been achieved in a number of different ways. For example, in U.S. Pat. Nos. 4,238,884 and 4,628,605, a forward force (in the cutting direction) is applied by a blade roller directly to the saw blade during the cutting stroke, and forward motion of the saw blade is accommodated by a forgiving interconnection between the spindle and the drive mechanism. In U.S. Pat. No. 5,212,887, the spindle reciprocates through a pivotally-mounted bushing, and the back end of the spindle is connected to an eccentric member that provides forward-rearward motion to the spindle. In U.S. Pat. Nos. 4,962,588 and 4,550,501, the back end of the spindle is moved forward-rearward by connection to a cam surface on a rotating gear, and in U.S. Pat. No. 5,392,519 the back end of the spindle in moved forward-rearward by connection to an eccentric member.

SUMMARY OF THE INVENTION

The utilization of blade rollers, cam surfaces, and eccentric members can be unnecessarily complicated and expensive. Further, such devices tend to wear down, and some can introduce unwanted vibrations into the saw. Accordingly, it is an object of the present invention to provide a saw that approaches the better cutting performance of orbital saws without the complexity required for orbital motion. It is a related object of the present invention to achieve a forward motion of the saw blade during the cutting stroke without resorting to orbital motion.

The above-noted objects are achieved by a method of reciprocating a spindle of a reciprocating saw, the spindle generally having a front end adapted to receive a saw blade movable through a cutting stroke and a return stroke. The method generally comprises the steps of reciprocating the front end along a first path (e.g., a neutral path) during the cutting stroke and along the same first path during the return stroke, and adjusting the saw such that the front end reciprocates along a second path during the cutting stroke and along the same second path during the return stroke. The second path is oblique to the first path. By virtue of this method, the front end of the spindle follows a path that is not orbital, and therefore can be achieved using a much simpler mechanism. In addition, the front end of the spindle can be moved in a neutral path or, alternatively, in an oblique path that plunges into the workpiece.

In another aspect, the present invention provides a method of reciprocating a spindle of a reciprocating saw, the spindle having a first cutting direction and a second cutting direction opposite the first cutting direction. The method generally comprises the steps of moving the front end along a first cutting path during the cutting stroke, the first cutting path characterized by movement at least partially in the first cutting direction, returning the front end along a return stroke (e.g., along the first cutting path), and adjusting the saw such that the front end moves along a second cutting path during the cutting stroke, the second cutting path characterized by movement at least partially in the second cutting direction. Preferably, the saw can also be adjusted such that the front end moves along a neutral cutting path during the cutting stroke, the neutral cutting path characterized by movement substantially perpendicular to the first and second cutting directions. By virtue of this method, the saw can be used to achieve a plunge cut in either down-cutting or up-cutting situations.

In addition, in some aspects, the invention provides a reciprocating saw generally comprising, a housing, a spindle mounted for reciprocation relative to the housing, the spindle having an end adapted to receive a saw blade, the saw blade having a first orientation relative to the spindle to have a first cutting direction and a second orientation relative to the spindle to have a second cutting direction opposite the first cutting direction, and a drive assembly connected to the spindle and operable to selectively drive the saw blade along a first path of travel during a first cutting stroke and along a second path of travel during a second cutting stroke. The first path of travel is characterized by movement at least partially in the first cutting direction and the second path of travel is characterized by movement at least partially in the second cutting direction.

In another aspect, the present invention provides a method of reciprocating a spindle of a reciprocating saw, the reciprocating saw including a housing, the spindle having an end adapted to support a saw blade for reciprocating movement relative to the housing. The method generally comprises the acts of securing the saw blade to the end of the spindle in a first orientation, in which the saw blade has a first cutting direction, reciprocating the end of the spindle such that the saw blade moves along a first path of travel relative to the housing, the first path of travel being characterized by movement at least partially in the first cutting direction, adjusting the orientation of the saw blade relative to the spindle from the first orientation to a second orientation, in which the saw blade has a second cutting direction opposite the first cutting direction, and reciprocating the end of the spindle such that the saw blade moves along a second path of travel relative to the housing, the second path of travel being characterized by movement at least partially in the second cutting direction.

In addition in some aspects, the present invention provides a reciprocating saw generally comprising a housing, a spindle mounted for reciprocation relative to the housing, the spindle having an end adapted to receive a saw blade, the saw blade having a first orientation relative to the spindle to have a first cutting direction and a second orientation relative to the spindle to have a second cutting direction opposite the first cutting direction, and an orbital drive assembly connected to the spindle and operable to selectively drive the saw blade along a first path of travel during a first cutting stroke and along a second path of travel during a second cutting stroke. The first path of travel is a first orbital path characterized by movement at least partially in the first cutting direction and the second path of travel is a second orbital path characterized by movement at least partially in the second cutting direction.

BRIEF DESCRIPTION OF THE DRAWINGS

FIG. 1 is a partial side section view of a reciprocating saw embodying the present invention with the guide member in a down-cutting position and the spindle in a fully retracted position.

FIG. 2 is the partial side section view of FIG. 1 with the spindle in a fully extended position.

FIG. 11 is a partial side view of the internal drive components of the reciprocating saw of FIG. 1 with the guide member in a neutral or non-rocking position.

FIG. 12 is a partial side view of the internal drive components of the reciprocating saw of FIG. 1 with the guide member in an up-cutting position.

DETAILED DESCRIPTION

Figure 3:
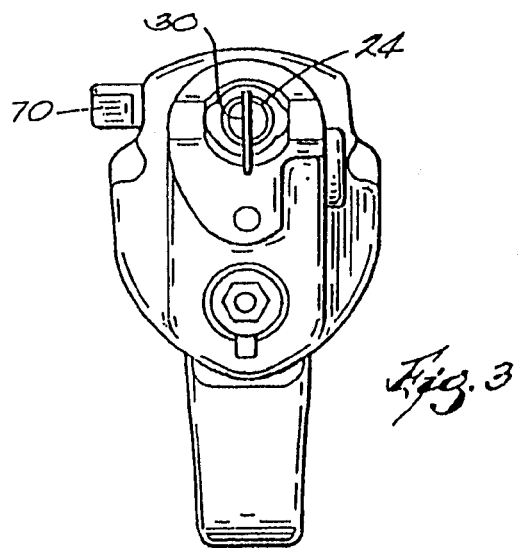
FIG. 3 is a front view of the reciprocating saw shown in FIG. 1.
Figure 4:
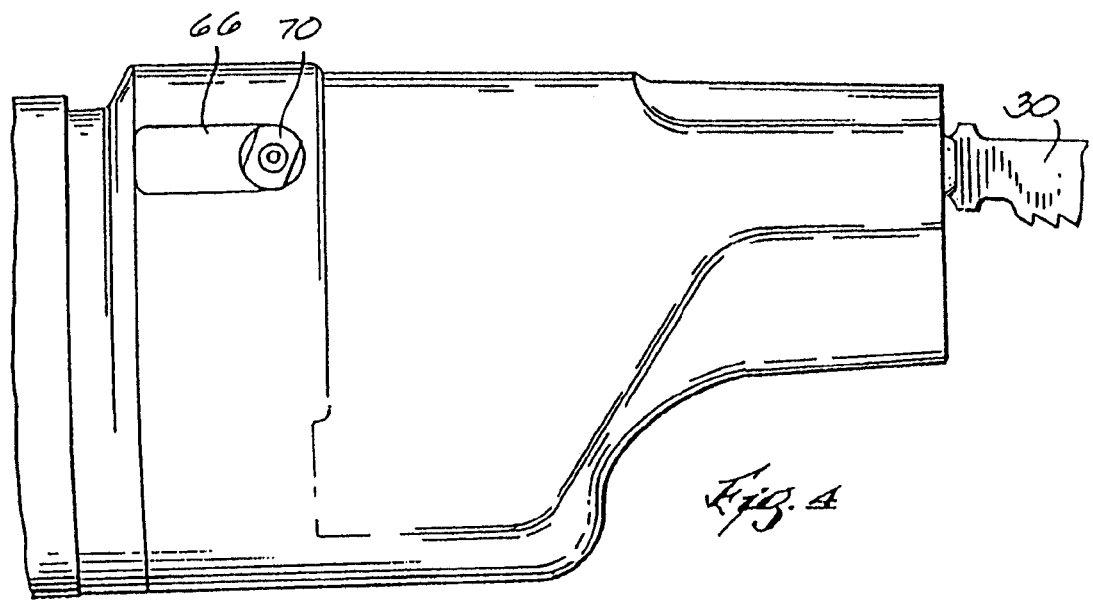
FIG. 4 is a partial right side view of the reciprocating saw shown in FIG. 1.

Before at least one construction of the invention is explained in detail, it is to be understood that the phraseology and terminology used herein with reference to element orientation (such as, for example, terms like "upward", "downward", "forward", "rearward", etc.) are only used to simplify description of the present invention, and do not alone indicate or imply that the element referred to must have a particular orientation. In addition, terms such as "first", "second" and "third" are used herein for purposes of description and are not intended to indicate or imply relative importance or significance.

FIGS. 1 and 2 illustrate a reciprocating saw 20 embodying the present invention. The reciprocating saw 20 generally includes a main housing 22, a spindle 24 reciprocatably mounted within the housing 22, and a counterweight 26 reciprocatably mounted with the housing 22. The spindle 24 includes a front end 28 that supports a saw blade 30, which is designed to cut in a cutting direction 32 (i.e., in the direction of the saw teeth) opposite a second or non-cutting direction 34. The spindle 24 reciprocates the saw blade 30 through a cutting stroke (usually toward the housing 22) and a return stroke (usually away from the housing 22). The counterweight 26 provides a vibration-reducing force that at least partially counteracts the forces created by movement of the spindle 24 and the saw blade 30.

The reciprocating saw 20 includes a drive assembly 35, which is connected to the spindle 24 and is operable to reciprocate the front end 28 of the spindle 24 and the saw blade 30 along a number of different travel paths.

In illustrated construction of FIGS. 1-12, the drive assembly 35 is operable to drive the front end 28 of the spindle 24 and the saw blade 30 along a first path, which is characterized by rocker motion in the first cutting direction 32, and along a second path, which is characterized by rocker motion in the second cutting direction 34. In other constructions, such as the illustrated constructions of FIGS. 13-19 and FIGS. 20-23, the drive assembly 35 is operable to drive the front end 28 of the spindle 24 and the saw blade 30 along a first path, which is characterized by orbital motion in the first cutting direction 32, and along a second path, which is characterized by orbital motion in the second cutting direction 34.

In still other constructions, the drive assembly 35 can drive the front end 28 of the spindle 24 and the saw blade 30 along a first path, which is characterized by rocker motion in the first cutting direction 32, and along a second path, which is characterized by orbital motion in the second cutting direction 34. Also, in other constructions, the drive assembly 35 can drive the front end 28 of the spindle 24 and the saw blade 30 along a first path, which is characterized by orbital motion in the first cutting direction 32, and along a second path, which is characterized by rocker motion in the second cutting direction 34.

In still other constructions, the drive assembly 35 can drive the front end 28 of the spindle 24 and the saw blade 30 along three or more paths, each of which can include orbital motion, rocking motion or neutral motion (i.e., in a substantially linear direction) and can be characterized by motion in the first cutting direction 32 and/or the second cutting direction 34.

A drive means in the form of an electric motor (not shown) is mounted in the housing 22. The motor includes a drive pinion 36 that engages a gear 38 mounted on a jack shaft 40 that is rotatably mounted within the housing 22. A wobble shaft 42 is positioned over the jack shaft 40 and is designed to drive primary and secondary wobble plates 44, 46 in a conventional manner. The primary wobble plate 44 includes a primary drive arm 48 that extends through a slot 50 (FIG. 6) in the counterweight 26 to drivingly engage the reciprocating spindle 24. The secondary wobble plate 46 includes a secondary drive arm 52 that drivingly engages the counterweight 26.

In addition to being mounted for reciprocating motion, the reciprocating spindle 24 is also mounted for rocking motion relative to the housing 22. Such rocking motion is facilitated by a spherical bearing sleeve 54 pivotably mounted within the housing 22. The spherical bearing sleeve 54 rocks relative to the housing 22, and the reciprocating spindle 24 reciprocates through the bearing sleeve 54. It should be appreciated that, instead of a spherical bearing sleeve 54, the bearing sleeve 54 could comprise a plane bearing sleeve mounted to the housing 22 for pivoting motion about a horizontal axis.

The reciprocating spindle 24 of the construction illustrated in FIGS. 1-12 is designed to move in three distinct motions: a down-cutting rocking motion, a neutral or non-rocking motion, and an up-cutting rocking motion. FIGS. 1 and 2 illustrate the down-cutting rocking motion. Such motion is generated due to the interconnection between the spindle 24 and an inclined track member 56. Such interconnection is provided by the interconnection between a rear end 58 of the spindle 24 and the counterweight 26, and further by the interconnection between the counterweight 26 and the inclined track member 56. More specifically, the rear end 58 of the spindle 24 is designed to be supported by and to slide within the counterweight 26. Accordingly, any oblique motion (i.e., angled relative to the longitudinal extent of the reciprocating spindle 24) of the counterweight 26 will result in oblique motion of the rear end of the spindle 24 and rocking motion of the spindle 24 about the spherical bearing sleeve 54.

Figure 5:
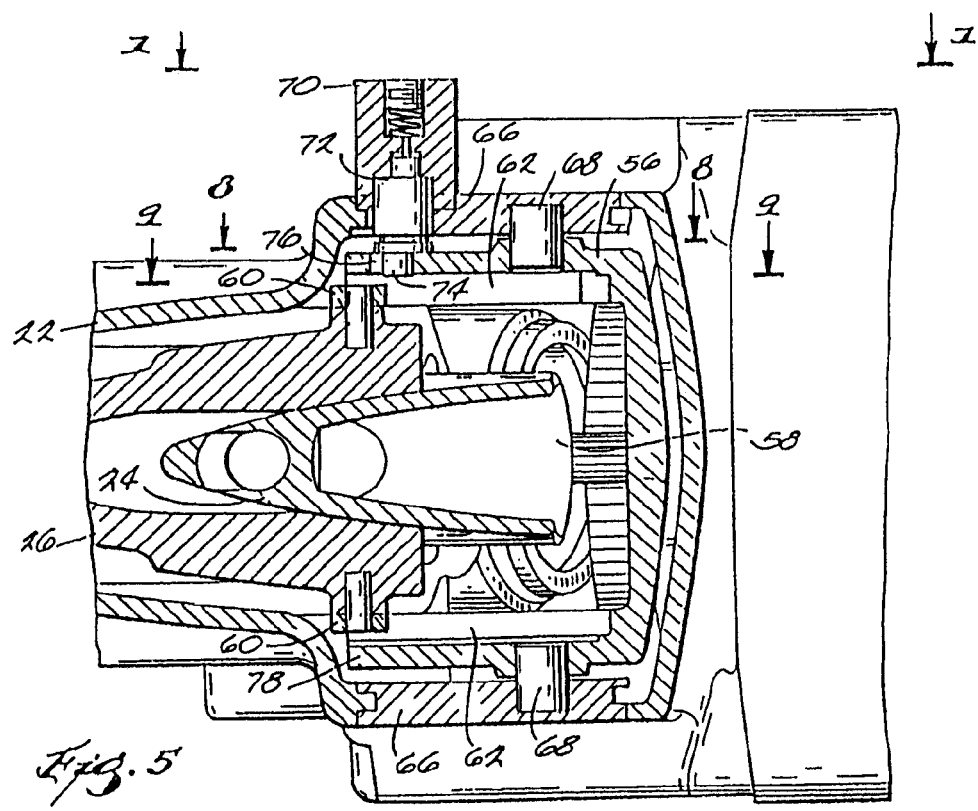
FIG. 5 is a section view taken along line 5-5 in FIG. 1.

Referring to FIG. 5, in addition to riding on the reciprocating spindle 24, the counterweight 26 is slidably interconnected with the track member 56. In this regard, two follower members in the form of bearings 60 are secured to opposing sides of the counterweight 26 and slidably engage a slot 62 in the track member 56. Because the track member 56 is inclined relative to the longitudinal extent of the counterweight 26 (as shown in FIG. 1), the sliding interaction between the counterweight 26 and the track member 56 will result in oblique movement of the counterweight 26 as the counterweight 26 is reciprocated within the housing 22. More specifically, as the counterweight 26 is moved from the position shown in FIG. 1 to the position shown in FIG. 2, the counterweight 26 moves downwardly (as viewed in FIGS. 1 and 2) within the housing 22, resulting in upward movement of both the front end 28 of the spindle 24 and the corresponding saw blade 30. During this upward movement of the saw blade 30, the spindle 24 is being extended. As the spindle 24 is being retracted, the counterweight 26 is extended and moved upward slightly, following the track member 56. Such upward movement of the counterweight 26 results in downward movement of the saw blade 30. Accordingly, it can be seen that the saw blade 30 moves downward slightly (i.e., in the cutting direction 32) during the cutting stroke, and upward slightly (i.e., in the non-cutting direction 34) during the return stroke. However, the cutting stroke and return stroke occur along the same path, and therefore the path of the saw blade 30 is not orbital.

In the illustrated embodiment, the slot 62 in the track member 56 is substantially linear. Alternatively, the slot could be curved.

Figure 6:
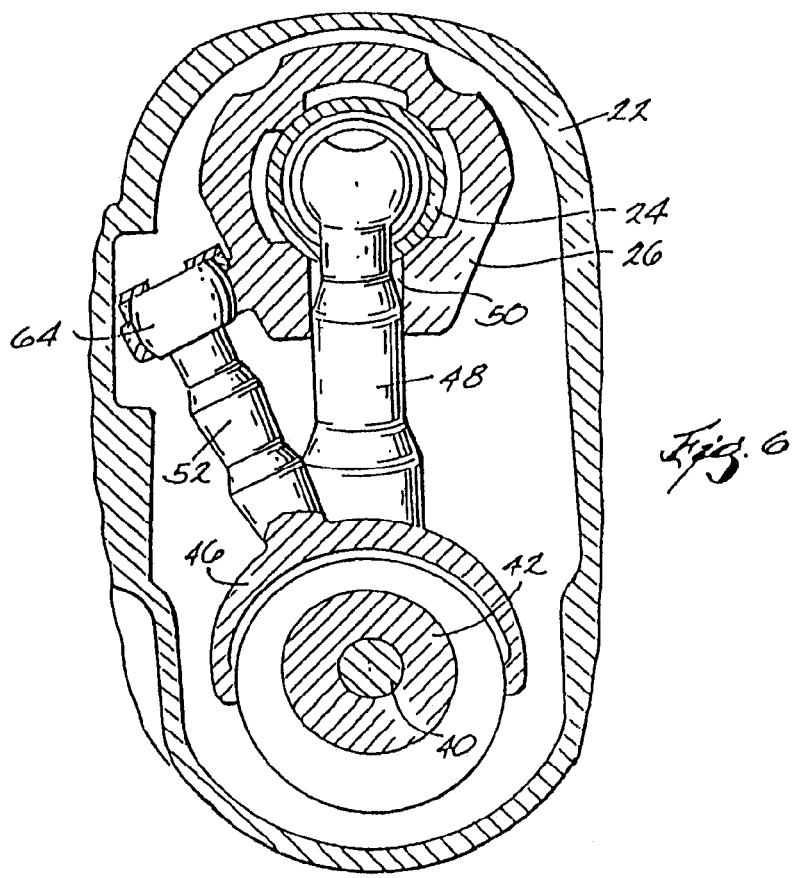
FIG. 6 is a section view taken along line 6-6 in FIG. 1.
Figure 7:
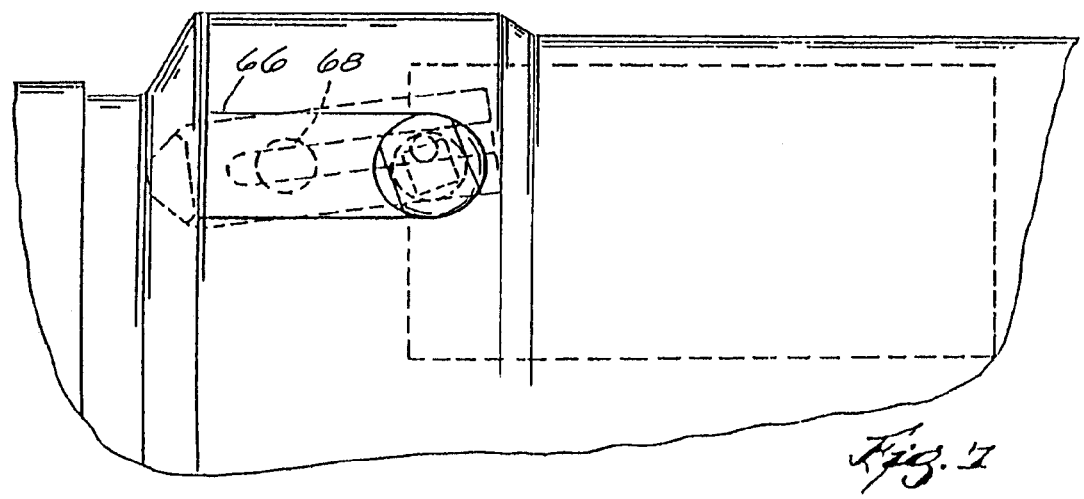
FIG. 7 is a right side view of the reciprocating saw taken along line 7-7 in FIG. 5.
Figure 8:
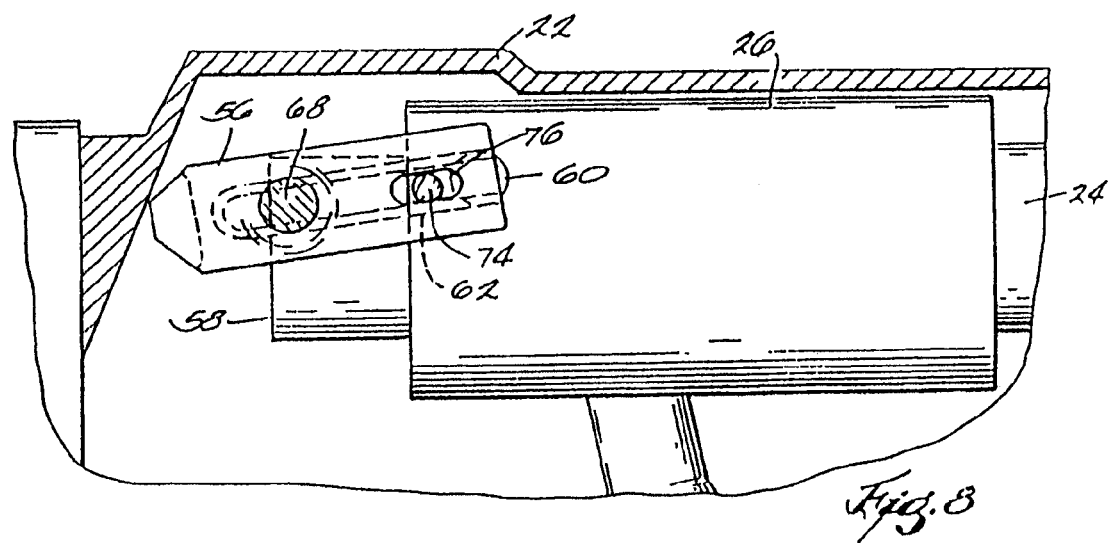
FIG. 8 is a section view taken along line 8-8 in FIG. 5.
Figure 9:
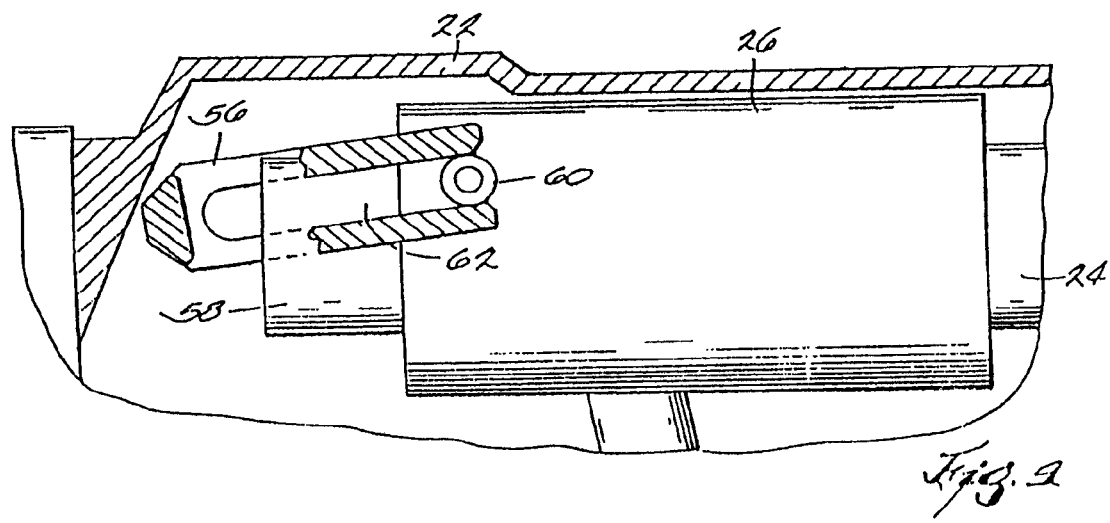
FIG. 9 is a section view taken along line 9-9 in FIG. 5.

Turning to FIG. 6, in order to accommodate oblique movement of the counterweight 26, the interconnection between the secondary drive arm 52 and the counterweight 26 is provided by a spherical slide bearing 64. More specifically, the spherical slide bearing 64 provides for rocking motion between the secondary drive arm 52 and the counterweight 26, and the secondary drive arm 52 is also slidable within the spherical slide bearing 64 to accommodate transverse movement of the counterweight 26 relative to the secondary drive arm 52. Similarly, the primary drive arm 48 is interconnected with the spindle 24 by a spherical slide bearing (not shown).

In order to allow the path of the saw blade 30 to be adjusted, the angle of the track member 56 is adjustable. More specifically, referring to FIGS. 3-5 and 7-9, the track member 56 is pivotally mounted to a housing insert 66 by a pivot member 68. Adjustment of the angle of the track member 56 is accomplished by rotating an adjustment knob 70. The adjustment knob 70 can be rotated to provide rotation to an eccentric cam member 72 having an eccentric pin 74 that slidably engages an adjustment slot 76 in the track member 56. As the eccentric cam member 72 is rotated, the eccentric pin 74 provides transverse movement to the front end 78 of the track member 56, thereby causing rotation of the track member 56 about the pivot member 68.

Figure 10:
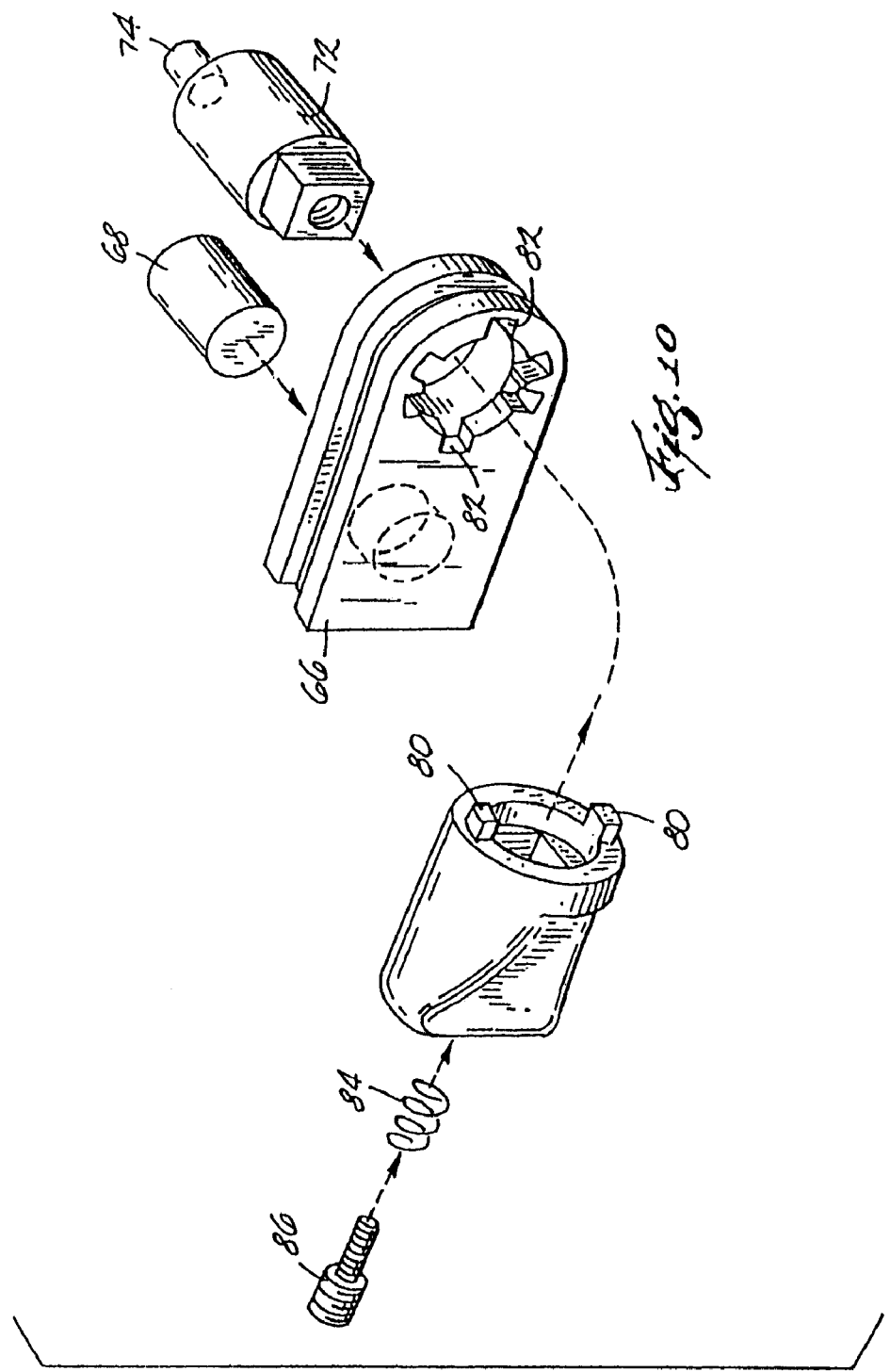
FIG. 10 is a perspective assembly view of the housing insert, follower member, eccentric cam member and adjustment knob.
Figure 13:
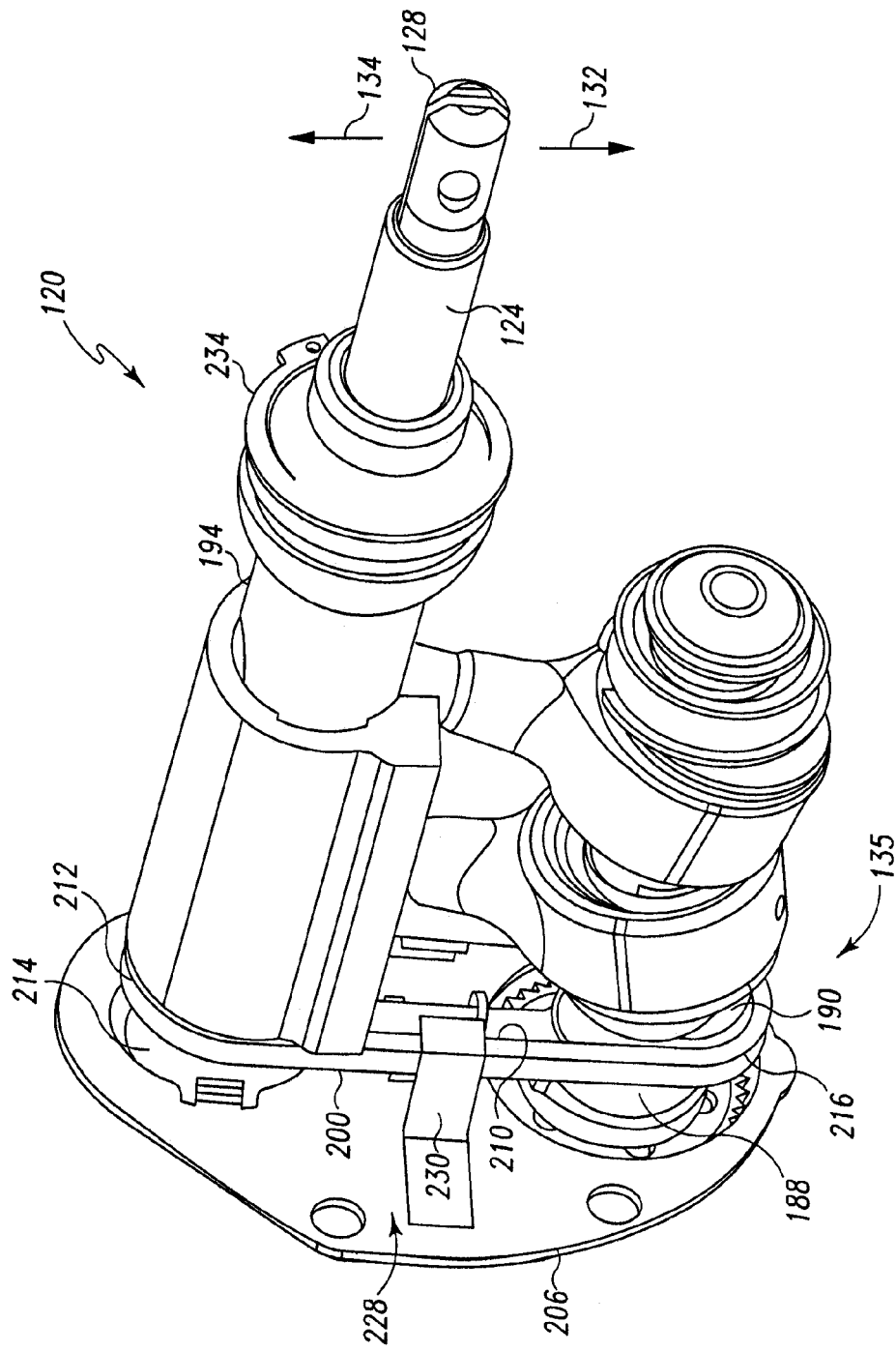
FIG. 13 is a front perspective view of another construction of a drive assembly for a reciprocating saw.
Figure 14:
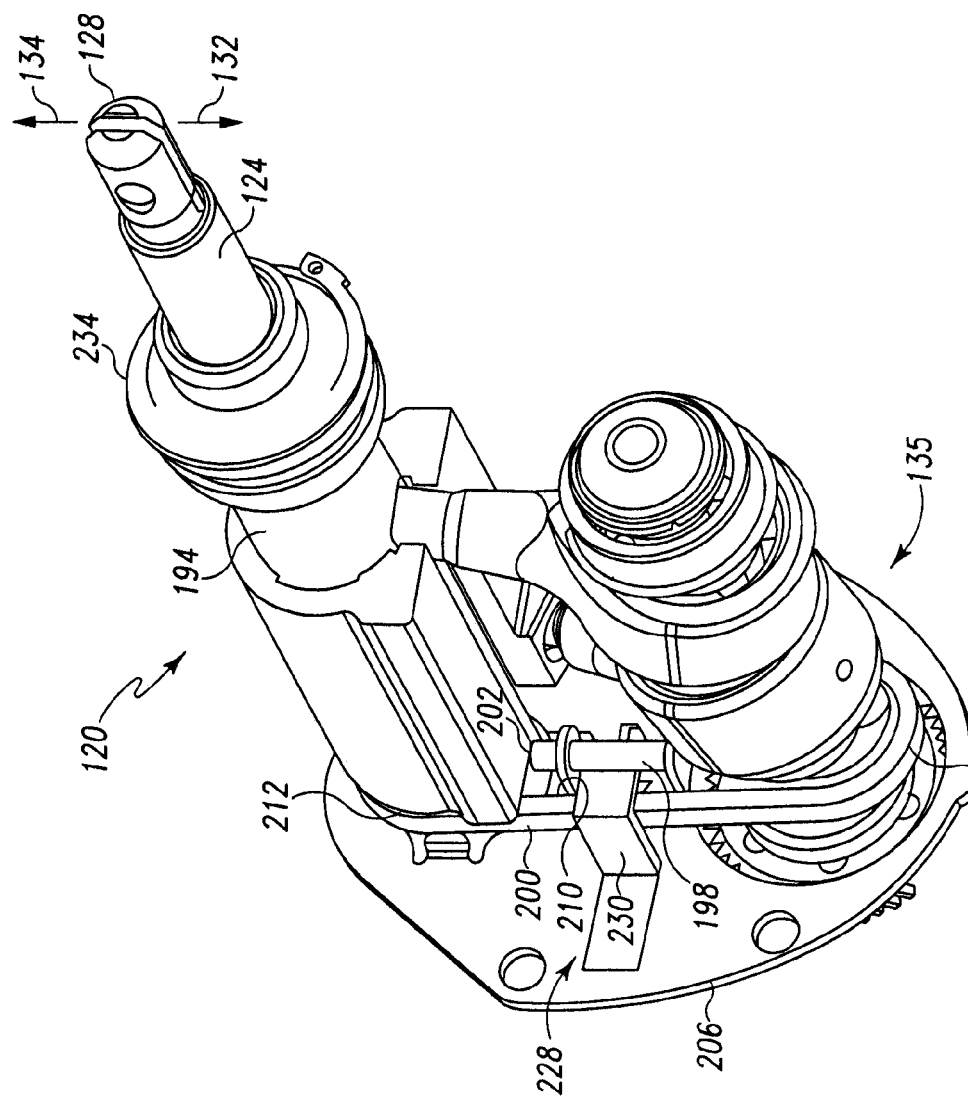
FIG. 14 is another front perspective view of the drive assembly of FIG. 13.

Referring to FIG. 10, to secure the position of the track member 56, the adjustment knob 70 is provided with two teeth 80 designed to selectively engage three pairs of corresponding recesses 82 in the housing insert 66. The adjustment knob 70 is biased toward the housing insert 66 by a spring 84 and a corresponding spring stop 86 secured to the eccentric cam member 72. Rotation of the adjustment knob 70 is accomplished by pulling the adjustment knob 70 away from the housing insert 66 until the teeth 80 are disengaged from the recesses 82 in the housing insert 66. Subsequently, the adjustment knob 70 can be rotated until the teeth 80 are aligned with a different pair of recesses 82. The adjustment knob 70 can then be released whereby the spring 84 will force the adjustment knob 70 and corresponding teeth 80 toward the housing insert 66 and into the corresponding recesses 82. The positions of the three pairs of recesses 82 in the housing insert 66 correspond with the three desired motions of the saw blade 30: down-cutting rocking motion, neutral or non-rocking motion, and up-cutting rocking motion.

FIG. 11 illustrates the reciprocating saw 20 with the track member 56 in the neutral or non-rocking position, resulting in movement of the front end 28 of the reciprocating spindle 24 in a path different than described above with respect to FIG. 1. Such positioning of the track member 56 is accomplished by rotating the adjustment knob 70, as described above in more detail. With the track member 56 in this position, the counterweight 26 and spindle 24 will not significantly rock about the spherical bearing sleeve 54, thereby resulting in a neutral or non-rocking motion of the saw blade 30. The neutral motion of the saw blade 30 is generally illustrated in FIG. 11 with the fully extended position of the saw blade 30 shown in solid lines and the fully retracted position of the saw blade 30 shown in broken lines. With the track member 56 in this position, the reciprocating saw 20 can be used for either up-cutting (as illustrated) or down-cutting.

FIG. 12 illustrates the reciprocating saw 20 with the track member 56 positioned in an up-cutting rocking position, resulting in movement of the front end 28 of the reciprocating spindle 24 in a path different than described above with respect to FIGS. 1 and 11. As noted above, such positioning of the track member 56 is accomplished by rotating the adjustment knob 70 to the appropriate position. With the track member 56 in this position, the saw blade 30 will follow the illustrated path, with the fully extended position of the saw blade 30 shown in solid lines and the fully retracted position of the saw blade 30 shown in broken lines. With the track member 56 in this position, the reciprocating saw 20 can be used for up-cutting in a cutting direction opposite that shown in FIG. 1.

To summarize, the down-cutting rocking motion of the saw blade 32 is illustrated in FIGS. 1 and 2. During the cutting stroke (moving from the position shown in FIG. 2 to the position shown in FIG. 1), the spindle 24 is retracted, and the counterweight 26 moves upwardly along the track member 56. As a result, a point on the saw blade (e.g., the tip of the saw blade 32) follows a curvilinear path, moving both toward the housing 22 (to the right in FIGS. 1 and 2) and downwardly (in the cutting direction 32). During the return stroke (moving from the position shown in FIG. 1 to the position shown in FIG. 2), the tip of the saw blade 32 returns along this curvilinear path (moves away from the housing 22 (to the left in FIGS. 1 and 2) and upwardly (in the non-cutting direction 34)) as the spindle 24 is extended and as the counterweight 26 moves downwardly along the track member 56. The tip of the saw blade 32 thus follows the same curvilinear path in the return stroke and in the cutting stroke.

The neutral, non-rocking motion of the saw blade 32 is illustrated in FIG. 11. During the cutting stroke (from the position shown in solid lines to the position shown in broken lines), the spindle 24 is retracted, and the counterweight 26 moves along the neutrally-positioned track member 56. As a result, the tip of the saw blade 32 follows a linear path, moving only toward the housing 22 (to the right in FIG. 11). During the return stroke (moving from the position shown in broken lines to the position shown in solid lines), the tip of the saw blade 32 returns along this linear path (moving only away from the housing 22 (to the left in FIG. 11)) as the spindle 24 is extended and as the counterweight 26 moves along the neutrally-positioned track member 56. The tip of the saw blade 32 thus follows the same linear path in the return stroke and in the cutting stroke.

Finally, the up-cutting rocking motion of the saw blade 32 is illustrated in FIG. 12. During the cutting stroke (moving from the position shown in solid lines to the position shown in broken lines), the spindle 24 is retracted, and the counterweight 26 moves downwardly along the track member 56. As a result, the tip of the saw blade 32 follows a curvilinear path (different from the curvilinear path illustrated in FIGS. 1 and 2), moving both toward the housing 22 (to the right in FIG. 12) and upwardly. During the return stroke (in FIG. 12, moving from the position shown in broken lines to the position shown in solid lines), the tip of the saw blade 32 returns along this curvilinear path (moves away from the housing 22 (to the left in FIG. 12) and downwardly) as the spindle 24 is extended and as the counterweight 26 moves upwardly along the track member 56. The tip of the saw blade 32 thus follows the same curvilinear path in the return stroke and in the cutting stroke.

FIGS. 13-19 illustrate an alternate construction of a drive assembly 135 for a reciprocating saw 120 according to the present invention. The drive assembly 135 in FIGS. 13-19 is similar in many ways to the illustrated constructions of FIGS. 1-12 described above. Accordingly, with the exception of mutually inconsistent features and elements between the constructions of FIGS. 13-19 and the constructions of FIGS. 1-12, reference is hereby made to the description above accompanying the constructions of FIGS. 1-12 for a more complete description of the features and elements (and the alternatives to the features and elements) of the construction of FIGS. 13-19. Features and elements in the construction of FIGS. 13-19 corresponding to features and elements in the constructions of FIGS. 1-12 are numbered in the 100 and 200 series.

The drive assembly 135 illustrated in FIGS. 13-19 is an orbital drive assembly, which is operable to drive the spindle 124 in an orbital motion (e.g., reciprocating and pivoting motion) along a plurality of travel paths, including a first path and a second path. Components of orbital drive assembly 135 may be similar to components shown and described in U.S. Pat. No. 6,249,979, issued Jun. 26, 2001, and U.S. patent application Ser. No. 09/892,096, filed Jun. 26, 2001, the entire contents of which are hereby incorporated by reference.

For cutting operations in which the drive assembly 135 drives the saw blade 30 along the first path, the saw blade 30 can be oriented with respect to the front end 128 of the spindle 124 so that the teeth 131 (shown in FIGS. 1 and 2) of the saw blade 30 are pointing in a generally downward direction (e.g., for down-cutting operations). The first path is characterized by a forward (i.e., in the first cutting direction 132) motion of the saw blade 30 as the saw blade 30 is being retracted toward the housing 22 (shown in FIGS. 1 and 2) during the cutting stroke, and a corresponding rearward (i.e., in the second cutting direction 134) motion of the saw blade 30 as the saw blade 30 is being extended away from the housing 22 during the return stroke. This motion results in a circuitous or orbital path of the saw blade 30.

For cutting operations in which the drive assembly 135 drives the saw blade 30 along the second travel path, the saw blade 30 can be reoriented with respect to the front end 128 of the spindle 124 so that the teeth 131 (shown in FIGS. 1 and 2) of the saw blade 30 are pointing in a generally upward direction (e.g., for up-cutting operations). The second path is characterized by forward (i.e., in the first cutting direction 132) motion of the saw blade 30 as the saw blade 30 is being extended away from the housing 22 during the return stroke, and a corresponding rearward (i.e., in the second cutting direction 134) motion of the saw blade 30 as the saw blade 30 is being retracted toward the housing 22 during the cutting stroke. This motion also results in a circuitous or orbital path of the saw blade 30.

As shown in the FIGS. 13-19, the drive assembly 135 includes a first eccentric cam member 188 and a second eccentric cam member 190 supported on the shaft 140. The first and second cam members 188, 190 have outer surfaces which are eccentric with respect to the axis of the shaft 140 so that the outer surface of the cam members 188, 190 rotate eccentrically about the axis of the shaft 140 as the shaft 140 rotates. In the illustrated construction, the first and second cam members 188, 190 are connected to the shaft 140 so that the eccentric portions of the first and second cam members 188, 190 are out of phase and are spaced apart around the axis of the shaft 140 by about 180 degrees. In other constructions, the eccentric portions of the first and second cam members 188, 190 can be in phase. In still other constructions, the eccentric portions of the first and second cam members 188, 190 can be oriented out of phase by between about 1 degree and about 179 degrees.

The drive assembly 135 also includes a tube chassis 194 that is supported in the housing 22 for pivoting movement relative to the housing 22. The tube chassis 194 is generally cylindrical and has a hollow inner portion for receiving a portion of the spindle 124.

As shown in FIGS. 13-19, the drive assembly 135 includes a first cam follower 198 and a second cam follower 200. The first cam follower 198 includes a head portion 202, which is selectively engageable with a rear portion 214 of the tube chassis 194, and a lower portion 204, which is selectively engageable with the outer surface of the first cam follower 198. A pin support member 206 is connected to the housing 22 and supports the first cam follower 198 so that the first cam follower 198 is movable relative to the support member 206 along the longitudinal axis of the first cam follower 198.

The second cam follower 194 is a generally elongated member and defines an elongated slot 210. As shown in FIGS. 13-19, portions of the tube chassis 194 and the shaft 140 extend through the elongated slot 210. An upper end 212 of the second cam follower 200 is engageable with the rear portion 214 of the tube chassis 194 and a lower end 216 of the second cam follower 200 is engageable with the outer surface of the second eccentric cam member 190.

In operation, the operator orients the saw blade 30 in either an up-cutting orientation (i.e., with the teeth 131 facing in a generally upward direction) or a down-cutting orientation (i.e., with the teeth 131 facing in a generally downward direction).

After the operator has oriented the saw blade 30 in a desired orientation with respect to the front end 128 of the spindle 124, the operator selects a travel path for the saw blade 30 by engaging the saw blade 30 with a workpiece. During up-cutting operations, the operator engages the teeth 131 of the saw blade 30 with a workpiece oriented above the housing 22, causing the tube chassis 194 to pivot about a forward flanged portion 234 so that the rear portion 214 of the tube chassis 194 is moved upwardly with respect to the housing 22. During down-cutting operations, the operator engages the teeth 131 of the saw blade 30 with a workpiece located below the housing 22, causing the tube chassis 194 to pivot about the forward flanged portion 234 so that the rear portion 214 of the tube chassis 194 is moved downwardly with respect to the housing 22.

In other constructions, the drive assembly 135 can include an orbital adjustment assembly 228, which is operable to change movement of the saw blade 30 between the first path and the second path. As shown in FIGS. 13-19, the adjustment assembly 228 can include a slide 230, which is selectively engageable with the first and second cam followers 198, 200 and is operable to move the first cam follower 198 out of engagement with the first eccentric cam member 188 during up-cutting operations and is operable to move the second cam follower 200 out of engagement with the second eccentric cam member 190 during down-cutting operations. The adjustment assembly 228 can also include an actuator. In these constructions, a first end of the actuator is engageable with the slide 230 and a second end of the actuator extends outwardly through the housing 22 for activation by an operator.

When an operator selects the first path, the chassis 194 is pivoted about the forward flanged portion 234 so that the rear portion 214 of the chassis 194 engages the head portion 202 of the first cam follower 198. The operator can then activate the motor which rotates the shaft 140 and the first eccentric cam member 188 about the axis of the shaft 140.

As the shaft 140 and the first eccentric cam member 188 rotate about the axis of the shaft 140, the outer surface of the first eccentric cam member 188 engages the lower portion 204 of the first cam follower 198, causing the first cam follower 198 to reciprocate along its axis. As the first cam follower 198 reciprocates, the head portion 202 of the first cam follower 198 engages the rear portion 214 of the tube chassis 194, forcing the rearward portion 214 of the tube chassis 194 upwardly relative to the housing 22.

In this manner, the drive assembly 135 pivots the tube chassis 194 relative to the housing 22 about a forward flanged portion 234 of the tube chassis 194, causing the spindle 124 to pivot with the tube chassis 194. This pivoting movement of the tube chassis 194 and the spindle 124, in combination with the reciprocating movement of the spindle 124 described above, causes the spindle 124 and the saw blade 30 to move along the first orbital path.

When the operator selects the second path, the chassis 194 is pivoted about the forward flanged portion 234 so that the rear portion 214 of the chassis 194 engages the upper end 212 of the second cam follower 200. The operator can then activate the motor, which, rotates the shaft 140 and the second eccentric cam member 200 about the axis of the shaft 140.

As the shaft 140 and the second eccentric cam member 190 rotate about the axis of the shaft 140, the second eccentric cam member 190 engages the lower end 216 of the second cam follower 200, causing the second cam follower 200 to reciprocate along its axis. As the second cam follower 200 moves downwardly along its axis, the upper end 212 of the second cam follower 200 engages the tube chassis 194, forcing the tube chassis 194 downwardly relative to the housing 22.

In this manner, the drive assembly 135 pivots the tube chassis 194 relative to the housing 22 about the forward flanged portion 234 of the tube chassis 194, causing the spindle 124 to pivot with the tube chassis 194. This pivoting movement of the tube chassis 194 and the spindle 124, in combination with the reciprocating movement of the spindle 124 described above, causes the spindle 124 and the saw blade 30 to move along the second orbital path.

In some constructions, the drive assembly 135 is also operable to drive the forward end 128 of the spindle 124 and the saw blade 30 along additional paths of travel. Such paths of travel can include orbital and/or rocker motion and can include motion in the first and/or second cutting directions 132, 134 as described above.

In addition, in some constructions, such as the illustrated construction of FIGS. 13-19, the drive assembly 135 is operable to drive the forward end 128 of the spindle 124 and the saw blade 30 along a neutral path, in which the spindle 124 reciprocates along a substantially linear path defined by the spindle axis. In these constructions, the drive assembly 135 can include a locking assembly 240, which is operable to prevent orbital and/or rocking motion of the spindle 124.

Figure 15:
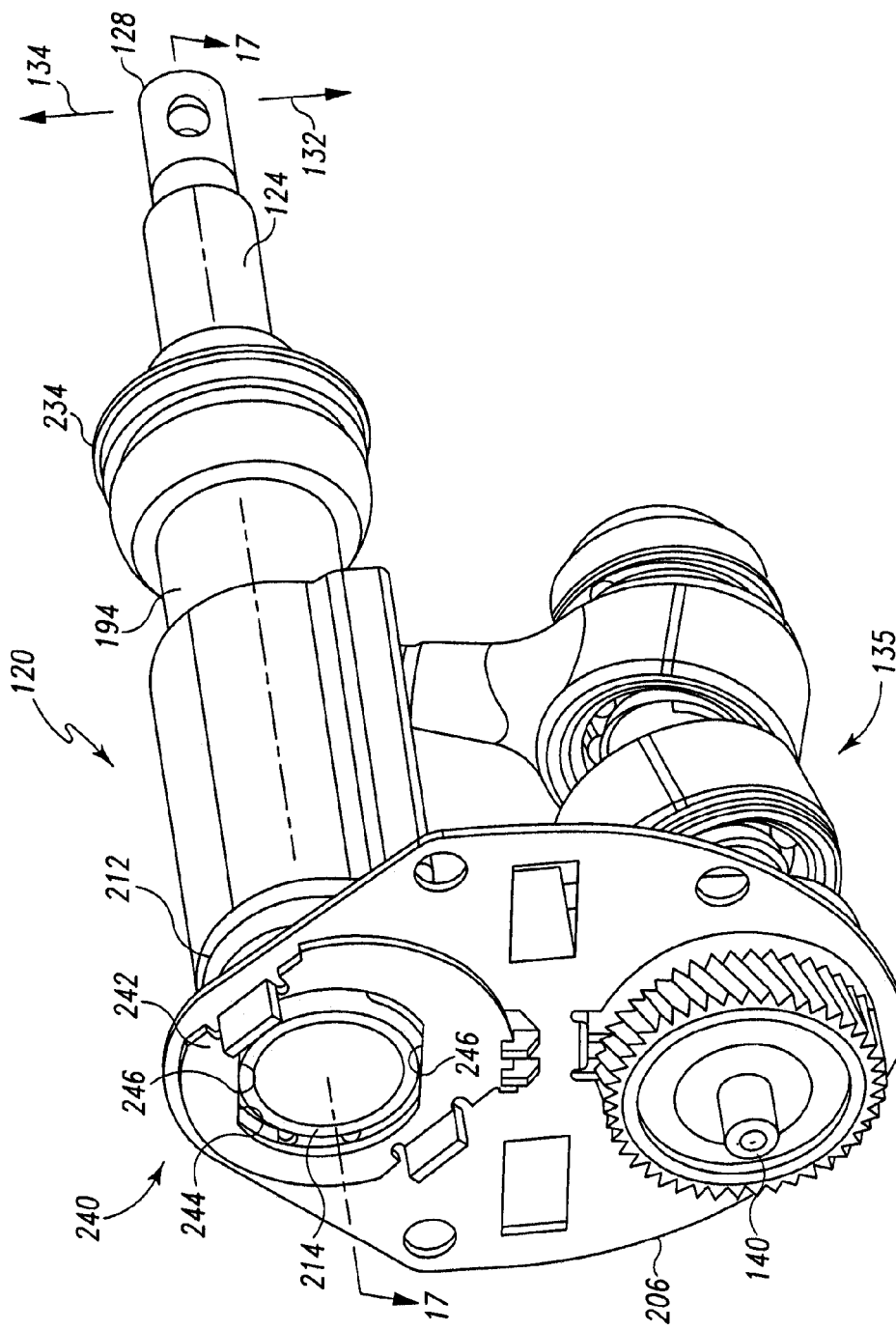
FIG. 15 is a rear perspective view of the drive assembly of FIG. 13.
Figure 16:
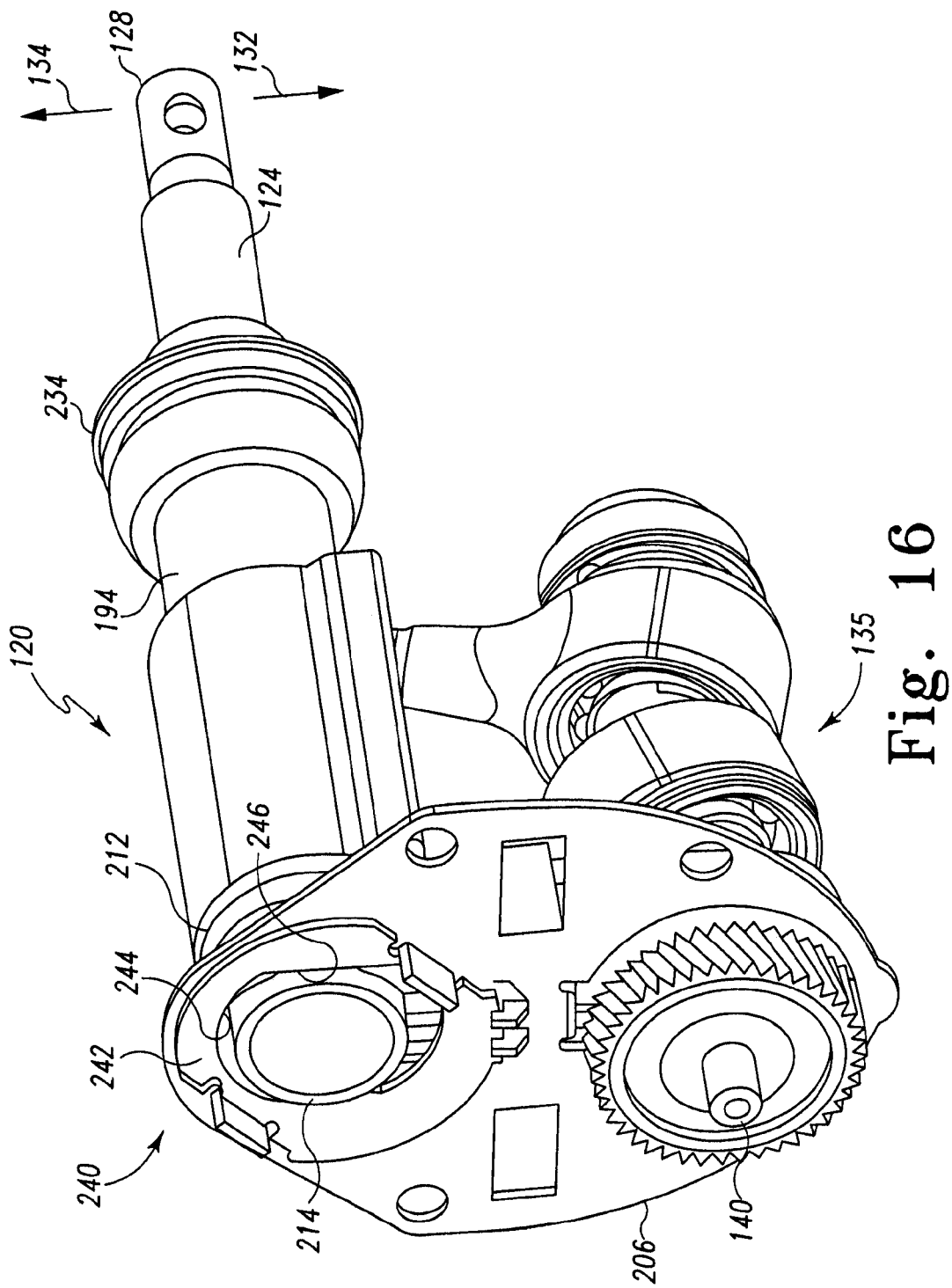
FIG. 16 is another rear perspective view of drive assembly of FIG. 13.
Figure 17:
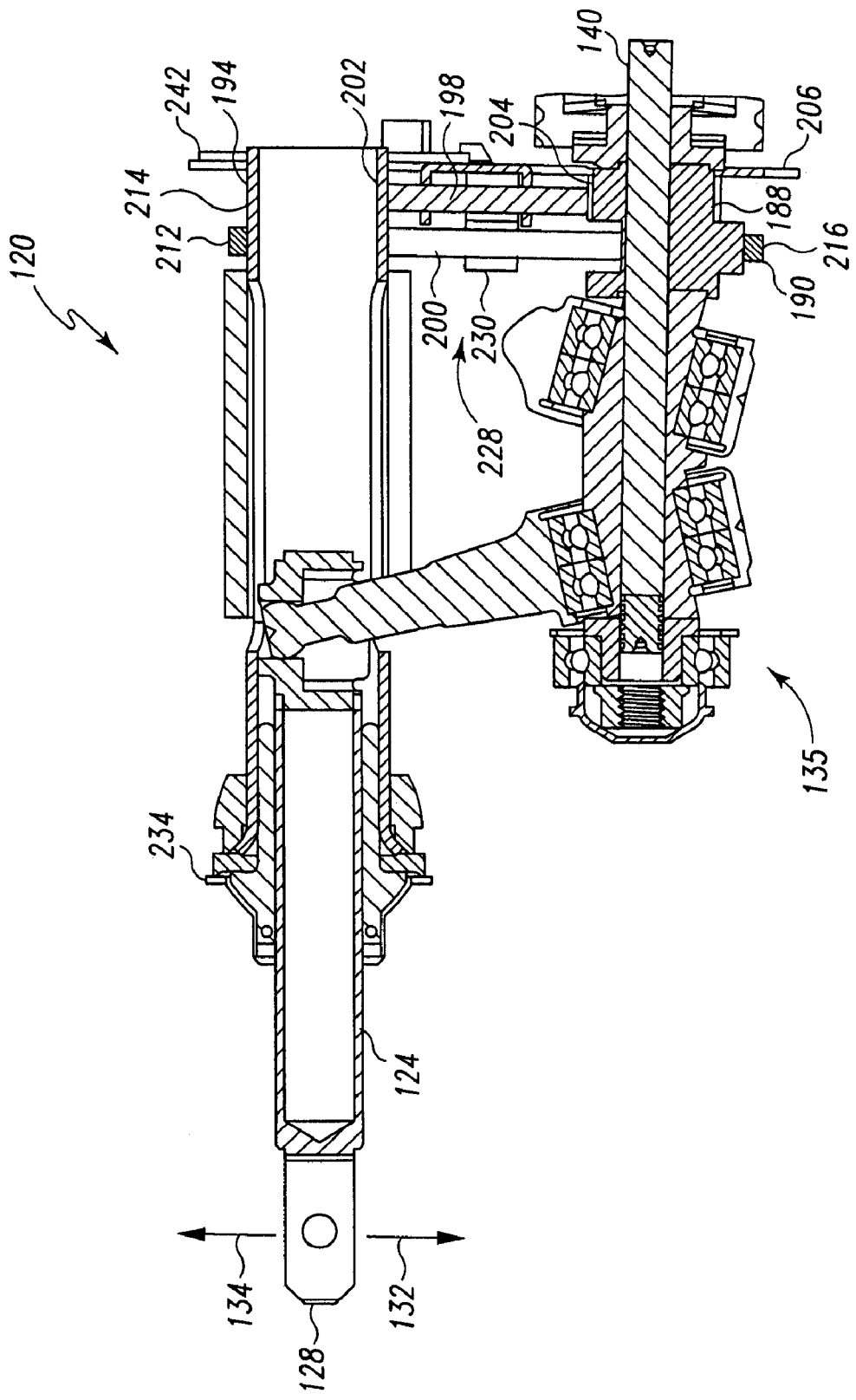
FIG. 17 is a cross-section view taken along line 17-17 of FIG. 15.
Figure 18:
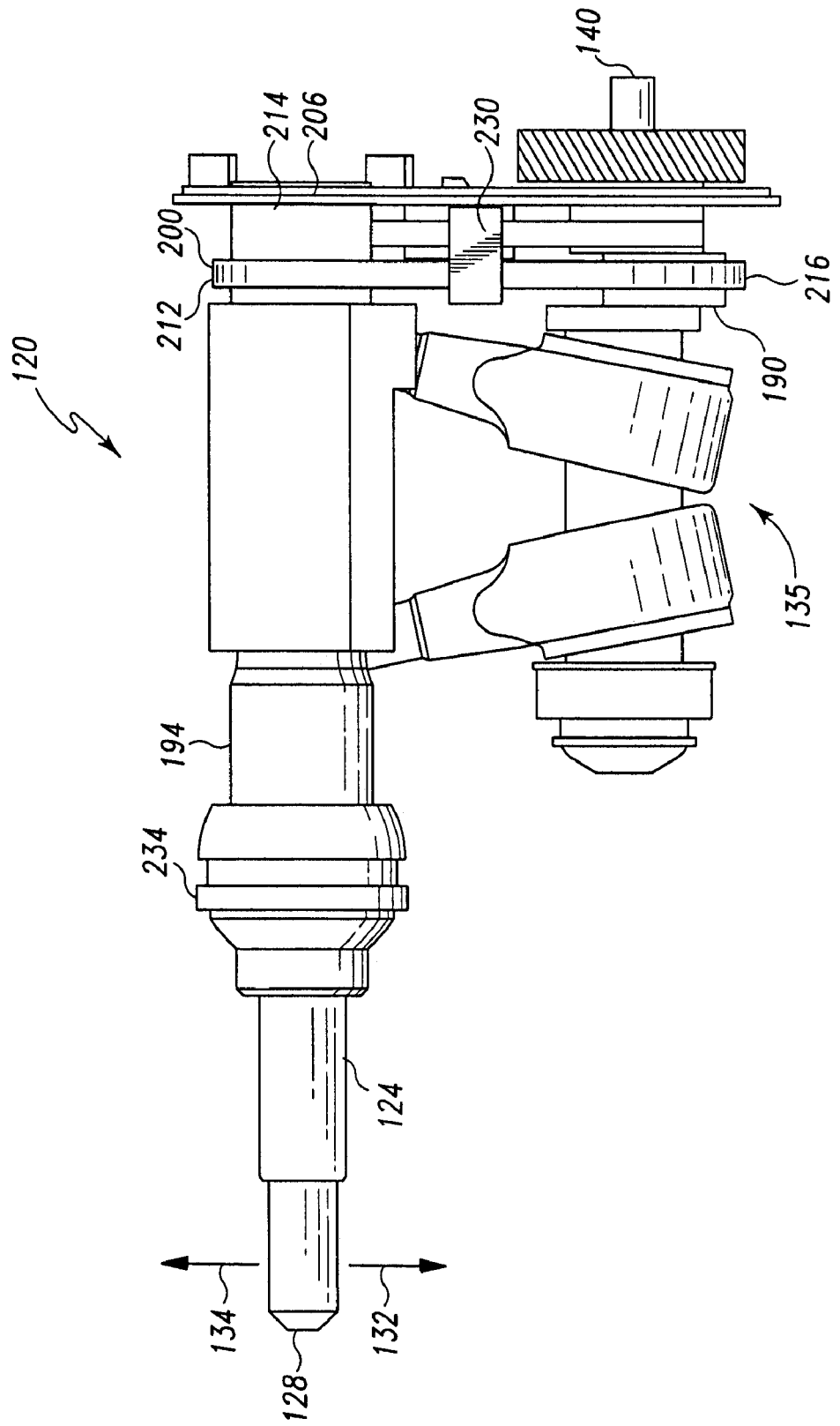
FIG. 18 is a side view of the drive assembly of FIG. 13.
Figure 19:
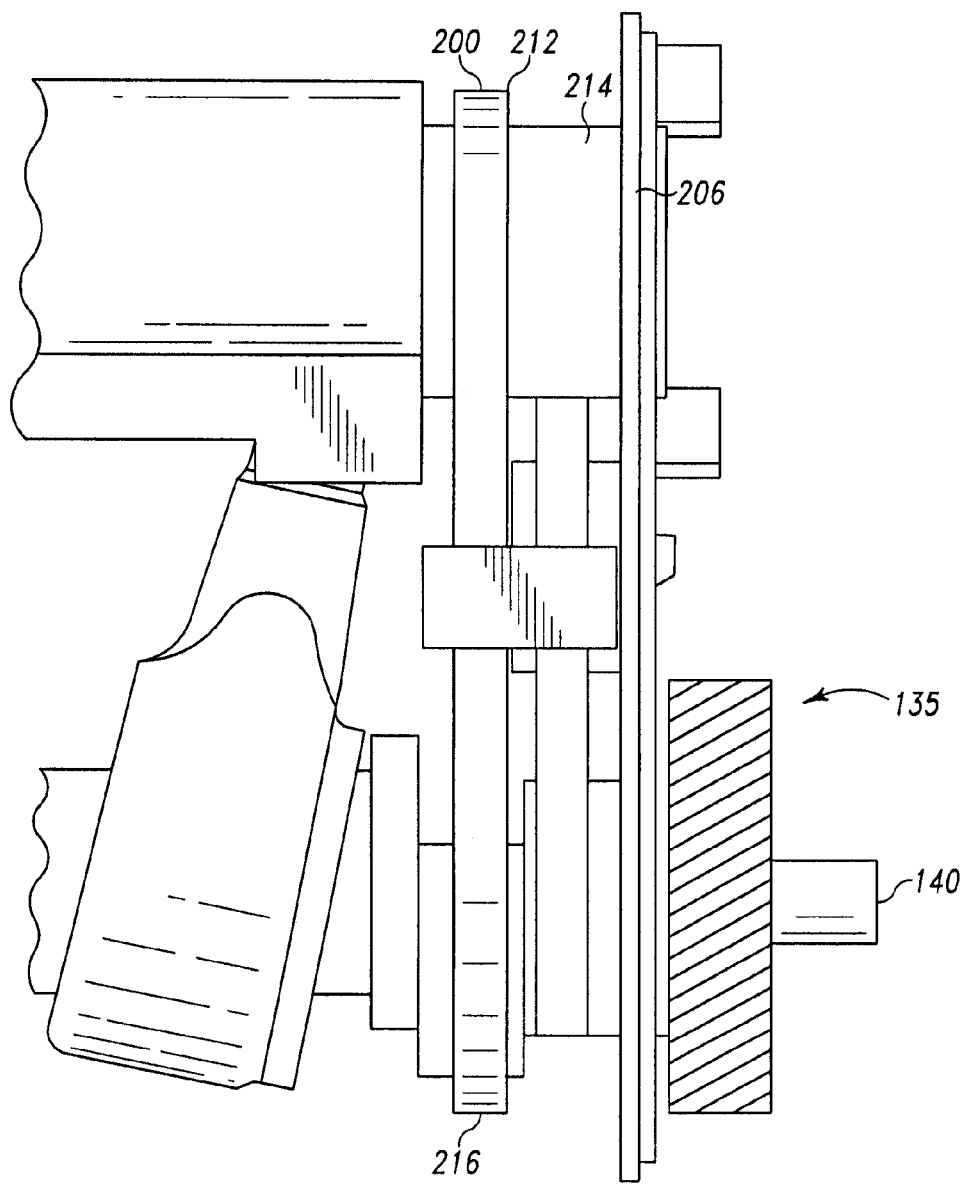
FIG. 19 is an enlarged side view of the drive assembly of FIG. 13.
Figure 21:
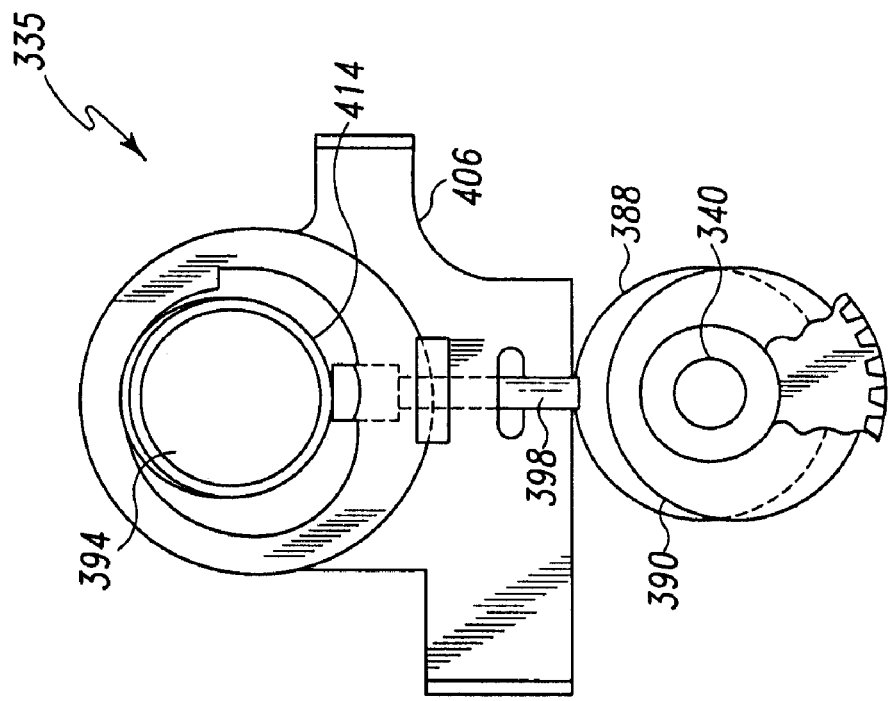
FIG. 21 is another front view of the drive assembly of FIG. 20.
Figure 20:
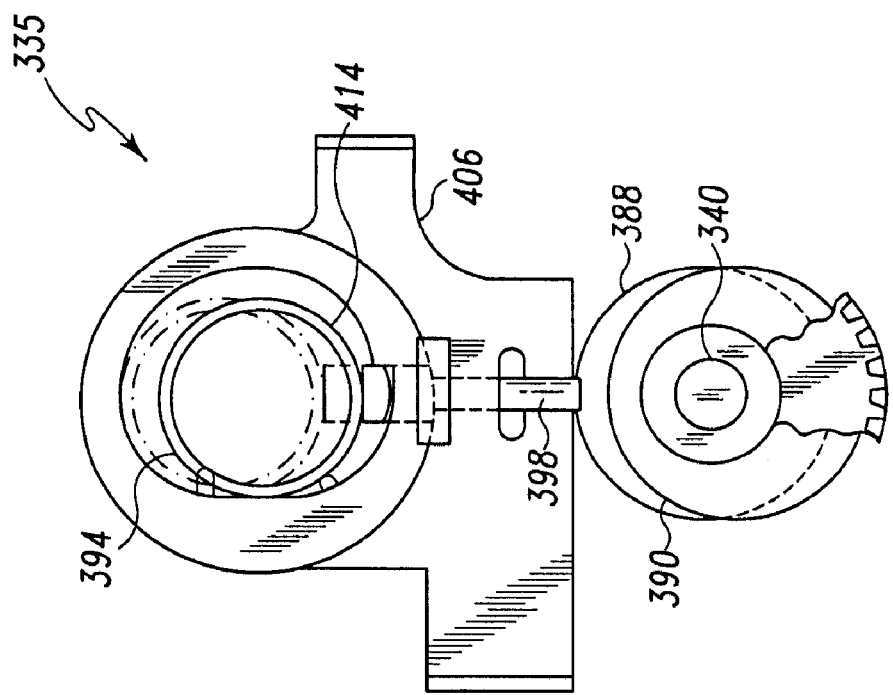
FIG. 20 is a front view of another construction of a drive assembly.
Figure 22:
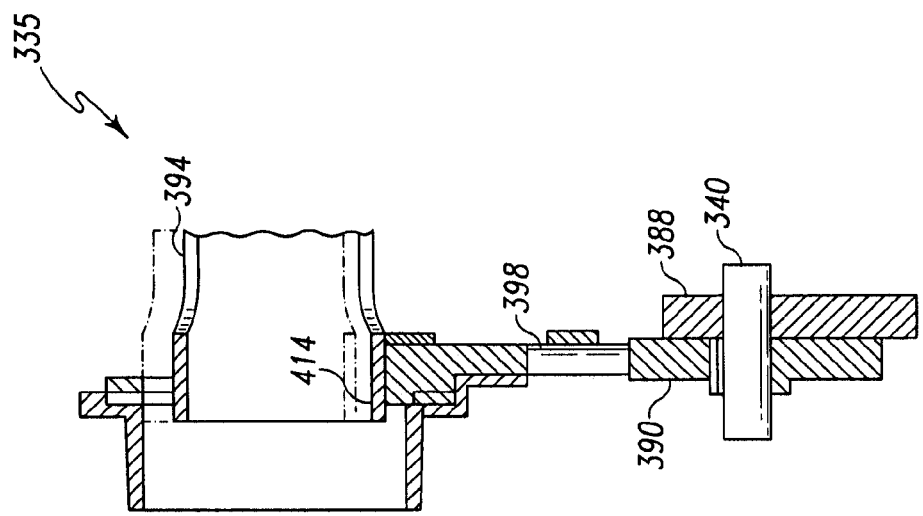
FIG. 22 is a side view of the drive assembly of FIG. 20.
Figure 23:
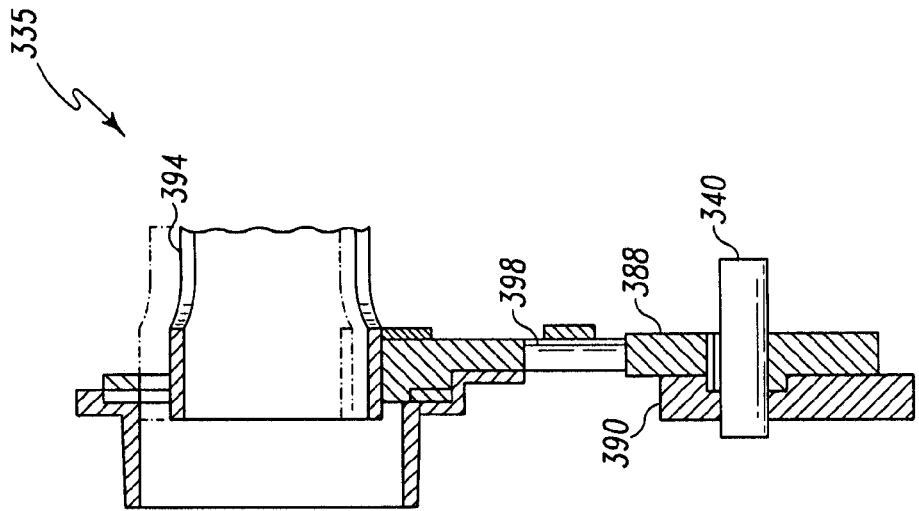
FIG. 23 is another side view of the drive assembly of FIG. 20.

As shown in FIGS. 15-16, the locking assembly 240 includes a locking plate 242, which is pivotably connected to the pin support member 206 for movement relative to the housing 22 between a locking position (shown in FIG. 15) and an unlocking position (shown in FIG. 16). In the illustrated construction, the locking plate 242 defines an elongated opening 244 having stops 246 located at opposite ends of the opening 244. The locking assembly 240 can also include an actuator for moving the locking plate 242 between the locking position and the unlocking position.

When the locking plate 242 is in the locking position, the stops 246 engage upper and lower portions of the tube chassis 194, preventing the tube chassis 194 from moving relative to the locking plate 242 and the housing 22 and thereby preventing orbital motion and/or rocking motion of the spindle 124. When the locking plate 242 is in the unlocking position, the stops 246 are moved out of engagement with the tube chassis 194 so that the tube chassis 194 can move upwardly and downwardly with respect to the housing 22, thereby allowing orbital motion and/or rocking motion of the spindle 124.

FIGS. 20-23 illustrate an alternate construction of a drive assembly 335 for a reciprocating saw according to the present invention. The drive assembly 335 in FIGS. 20-23 is similar in many ways to the illustrated constructions of FIGS. 1-19 described above. Accordingly, with the exception of mutually inconsistent features and elements between the constructions of FIGS. 20-23 and the constructions of FIGS. 1-19, reference is hereby made to the description above accompanying the constructions of FIGS. 1-19 for a more complete description of the features and elements (and the alternatives to the features and elements) of the construction of FIGS. 1-19. Features and elements in the construction of FIGS. 20-23 corresponding to features and elements in the constructions of FIGS. 1-19 are numbered in the 300 and 400 series.

As shown in the FIGS. 20-23, the drive assembly 335 includes a first eccentric cam member 388 and a second eccentric cam member 390 supported on the shaft 340. The drive assembly 335 also includes a cam follower 398 and a pin support member 406, which is connected to the housing 22 and supports the cam followers 398 for movement relative to the support member 406 along the longitudinal axis of the cam follower 398.

In operation, the operator orients the saw blade 30 in either an up-cutting orientation (i.e., with the teeth 131 facing in a generally upward direction) or a down-cutting orientation (i.e., with the teeth 131 facing in a generally downward direction). After the operator has oriented the saw blade 30 in a desired orientation with respect to the front end 128 of the spindle 124, the operator selects a travel path for the saw blade 30 by engaging the saw blade 30 with a workpiece, as described above.

When an operator selects a first path, the operator moves an actuator (not shown), which moves the cam follower 398 into engagement with the first eccentric cam member 388. The operator can then activate the motor, which reciprocates the shaft 140 and the first eccentric cam member 388 about the axis of the shaft 140.

The engagement between the outer surface of the first eccentric cam member 388 and the cam follower 298 and between the cam follower 398 and the rear portion 414 of the chassis 394 causes the tube chassis 394 to pivot relative to the housing 22. This pivoting movement of the tube chassis 394 and the spindle 124, in combination with the reciprocating movement of the spindle 324 described above, causes the spindle 124 and the saw blade 30 to move along the first orbital path.

When the operator selects the second path, the operator moves the actuator, which moves the cam follower 398 into engagement with the second eccentric cam member 390. The operator can then activate the motor, which reciprocates the shaft 140 and the second eccentric cam member 390 about the axis of the shaft 140.

The engagement between the outer surface of the second eccentric cam member 390 and the cam follower 298 and between the cam follower 398 and the rear portion 414 of the chassis 394 causes the tube chassis 394 to pivot relative to the housing 22. This pivoting movement of the tube chassis 394 and the spindle 324, in combination with the reciprocating movement of the spindle 324 described above, causes the spindle 324 and the saw blade 30 to move along the second orbital path.

The foregoing description of the present invention has been presented for purposes of illustration and description. Furthermore, the description is not intended to limit the invention to the form disclosed herein. Consequently, variations and modifications commensurate with the above teachings, and the skill or knowledge of the relevant art, are within the scope of the present invention. The embodiments described herein are further intended to explain best modes known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

What is claimed is:

1. A reciprocating saw comprising:
   a housing;
   a reciprocating member supported for reciprocating motion relative to the housing, the reciprocating member having a longitudinal axis;
   a drive mechanism operable to drive the reciprocating member;
   a motor operable to power the drive mechanism;
   an elongated surface supported by the housing and spaced apart from the drive mechanism, the elongated surface being inclinable relative to the longitudinal axis; and
   a surface follower connected to the reciprocating member and engageable with the surface to prevent rotation of the reciprocating member about the longitudinal axis.

2. The reciprocating saw of claim 1, wherein the reciprocating member is a counterweight.

3. The reciprocating saw of claim 2, further comprising a spindle supported for reciprocating motion relative to the housing.

4. The reciprocating saw of claim 2, further comprising a spindle, wherein the spindle is supported by and reciprocates within the counterweight.

5. The reciprocating saw of claim 1, wherein the surface includes a track.

6. The reciprocating saw of claim 1, wherein the surface follower includes a bearing.

7. The reciprocating saw of claim 1, further comprising an actuator extending outwardly from the housing and operable to adjust an angle of the surface relative to the housing.

8. A reciprocating saw comprising:
   a housing;
   a spindle supported in the housing for movement relative to the housing;
   a counterweight supported for reciprocating motion relative to the housing, the counterweight having a longitudinal axis;
   a drive mechanism operable to drive the counterweight, the drive mechanism including a first wobble plate coupled to the spindle and a second wobble plate coupled to the counterweight;
   a motor operable to power the drive mechanism;
   a surface pivotally supported by one of the housing and the counterweight for pivoting movement relative to the housing; and
   a surface follower connected to the other of the housing and the counterweight and engageable with the surface.

9. The reciprocating saw of claim 8, wherein the spindle is supported for reciprocating motion relative to the housing.

10. The reciprocating saw of claim 8, wherein the spindle is supported by and reciprocates within the counterweight.

11. The reciprocating saw of claim 8, wherein the surface is supported by the housing.

12. The reciprocating saw of claim 8, wherein the surface follower is movable along the surface and is connected to the counterweight.

13. The reciprocating saw of claim 8, wherein the surface follower is engageable with the surface to prevent rotation of the counterweight about the longitudinal axis.

14. The reciprocating saw of claim 8, further comprising an actuator extending outwardly from the housing and operable to move the surface relative to the housing.

15. A reciprocating saw comprising:
a housing;
a spindle supported in the housing for movement relative to the housing;
a reciprocating member supported for reciprocating motion relative to the housing, the reciprocating member having a longitudinal axis;
a drive mechanism operable to drive the reciprocating member;
a motor operable to power the drive mechanism;
a surface supported by the housing;
a bearing connected to the reciprocating member and engageable with the surface to prevent rotation of the reciprocating member about the longitudinal axis; and
an actuator extending outwardly from the housing and being operable to adjust an angle of the surface relative to the housing.

16. The reciprocating saw of claim 15, wherein the reciprocating member is a counterweight.

17. The reciprocating saw of claim 16, wherein the spindle is supported for reciprocating motion relative to the housing.

18. The reciprocating saw of claim 16, wherein the spindle is supported by and reciprocates within the counterweight.

19. The reciprocating saw of claim 15, wherein the surface includes a track.

20. The reciprocating saw of claim 15, further comprising a pin supporting the bearing.

21. A reciprocating saw comprising:
a housing;
a reciprocating member supported for reciprocating motion relative to the housing, the reciprocating member having a longitudinal axis, the reciprocating member having an upper extent lying in an upper plane and a lower extent lying in a lower plane, the upper and lower planes being substantially parallel to the longitudinal axis;
a drive mechanism operable to drive the reciprocating member;
a motor operable to power the drive mechanism;
a surface supported by one of the housing and the reciprocating member within a periphery defined by the upper plane and the lower plane; and
a surface follower connected to the other of the housing and the reciprocating member and engageable with the surface;
wherein engagement of the surface and surface follower is within the periphery defined by the upper plane and the lower plane;
wherein the surface is pivotally connected to the housing.

22. The reciprocating saw of claim 21, wherein the reciprocating member is a counterweight.

23. The reciprocating saw of claim 21, wherein the surface includes a track.

24. The reciprocating saw of claim 21, wherein the surface follower moves along the surface and is connected to the reciprocating member.

25. The reciprocating saw of claim 21, wherein the surface follower prevents rotation of the reciprocating member about the longitudinal axis.

26. The reciprocating saw of claim 21, wherein the surface follower includes a bearing.

27. The reciprocating saw of claim 21, further comprising an actuator extending outwardly from the housing and operable to adjust an angle of the surface relative to the housing.

* * * * *